United States Patent
Kawamura

(10) Patent No.: US 12,190,527 B2
(45) Date of Patent: Jan. 7, 2025

(54) IMAGE PROCESSING DEVICE, CONTROL METHOD THEREOF, IMAGING DEVICE, AND RECORDING MEDIUM

(71) Applicant: CANON KABUSHIKI KAISHA, Tokyo (JP)

(72) Inventor: Yuta Kawamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 17/671,102

(22) Filed: Feb. 14, 2022

(65) Prior Publication Data

US 2022/0270264 A1 Aug. 25, 2022

(30) Foreign Application Priority Data

Feb. 24, 2021 (JP) ................. 2021-027033

(51) Int. Cl.
```
G06T 7/187    (2017.01)
G06T 7/20     (2017.01)
G06T 7/70     (2017.01)
G06V 10/22    (2022.01)
G06V 40/10    (2022.01)
```
(52) U.S. Cl.
CPC ............. *G06T 7/187* (2017.01); *G06T 7/20* (2013.01); *G06T 7/70* (2017.01); *G06V 10/22* (2022.01); *G06V 40/10* (2022.01); *G06T 2207/20092* (2013.01); *G06T 2207/30201* (2013.01); *G06T 2207/30244* (2013.01)

(58) Field of Classification Search
CPC .. G06T 7/187; G06T 7/70; G06T 7/20; G06V 40/10
See application file for complete search history.

(56) References Cited

U.S. PATENT DOCUMENTS

| | | |
|---|---|---|
| 8,842,213 B2 | 9/2014 | Tomita et al. |
| 2020/0106953 A1* | 4/2020 | Suzuki ................ H04N 23/635 |

FOREIGN PATENT DOCUMENTS

| | | |
|---|---|---|
| JP | 2009-81714 A | 4/2009 |
| JP | 2012015889 A | 1/2012 |
| JP | 2012217101 A | 11/2012 |
| WO | 2012-144195 A1 | 10/2012 |

OTHER PUBLICATIONS

Office Action issued Nov. 19, 2024, in corresponding Japanese Patent Application No. 2021-07033, with English translation (8 pages).

* cited by examiner

*Primary Examiner* — Myron Wyche
(74) *Attorney, Agent, or Firm* — Venable LLP

(57) ABSTRACT

An image processing device that acquires an image and detects a subject. The image processing device includes at least one processor and a memory holding a program that causes the processor to function as a detection unit configured to detect a plurality of parts related to a same subject within the image, a determination unit configured to determine a priority part from the plurality of parts detected by the detection unit, and an extension unit configured to extend a region of the subject corresponding to a first part from the first part determined as the priority part in a direction of a second part that is different from the first part among the plurality of parts.

13 Claims, 14 Drawing Sheets

IMAGE PROCESSING DEVICE, CONTROL METHOD THEREOF, IMAGING DEVICE, AND RECORDING MEDIUM

CROSS-REFERENCE TO PRIORITY APPLICATION

This application claims the benefit of Japanese Patent Application No. 2021-027033, filed Feb. 24, 2021, which is hereby incorporated by reference herein in its entirety.

BACKGROUND OF THE INVENTION

Field of the Invention

The present invention relates to a technique of detecting and determining a subject within an image.

Description of the Related Art

An imaging device can acquire a feature amount of a specific region of an image from captured image data, focus on a detected subject, and capture an image with suitable brightness, color, etc. Japanese Patent Laid-Open No. 2009-81714 discloses a technique of continuously estimating the position of a face even in a situation when the direction of a subject's face, or the like, changes. By detecting a plurality of parts for one subject, it is possible to continue to accurately detect the subject. In addition, if a plurality of subjects are detected, a user can also perform a touch operation to select a subject desired to be photographed.

In the related art, if there is a part that is not a detection target among a plurality of detection parts, and a user performs a touch operation, or the like, on the part and designates the part, there is a possibility of a desired subject not being able to be selected.

SUMMARY OF THE INVENTION

The present invention makes it possible to perform designation between parts related to a subject within an image in image processing for subject detection.

According to an embodiment, the present invention provides an image processing device that acquires an image and detects a subject, the device including a detection unit configured to detect a plurality of parts related to a subject within the image, a determination unit configured to determine a priority part from the plurality of parts detected by the detection unit, and an extension unit configured to extend a region of the subject from the priority part in a direction of the part detected by the detection unit.

Further features of the present invention will become apparent from the following description of exemplary embodiments with reference to the attached drawings.

DESCRIPTION OF THE EMBODIMENTS

Hereafter, embodiments of the present invention will be described in detail with reference to the accompanying drawings. In each embodiment, an example of an imaging device to which an image processing device according to the present invention is applied is shown. The present invention can be applied to a video camera having a subject detection function, a digital still camera, and various electronic instruments having imaging units.

Embodiment 1

Figure 1:
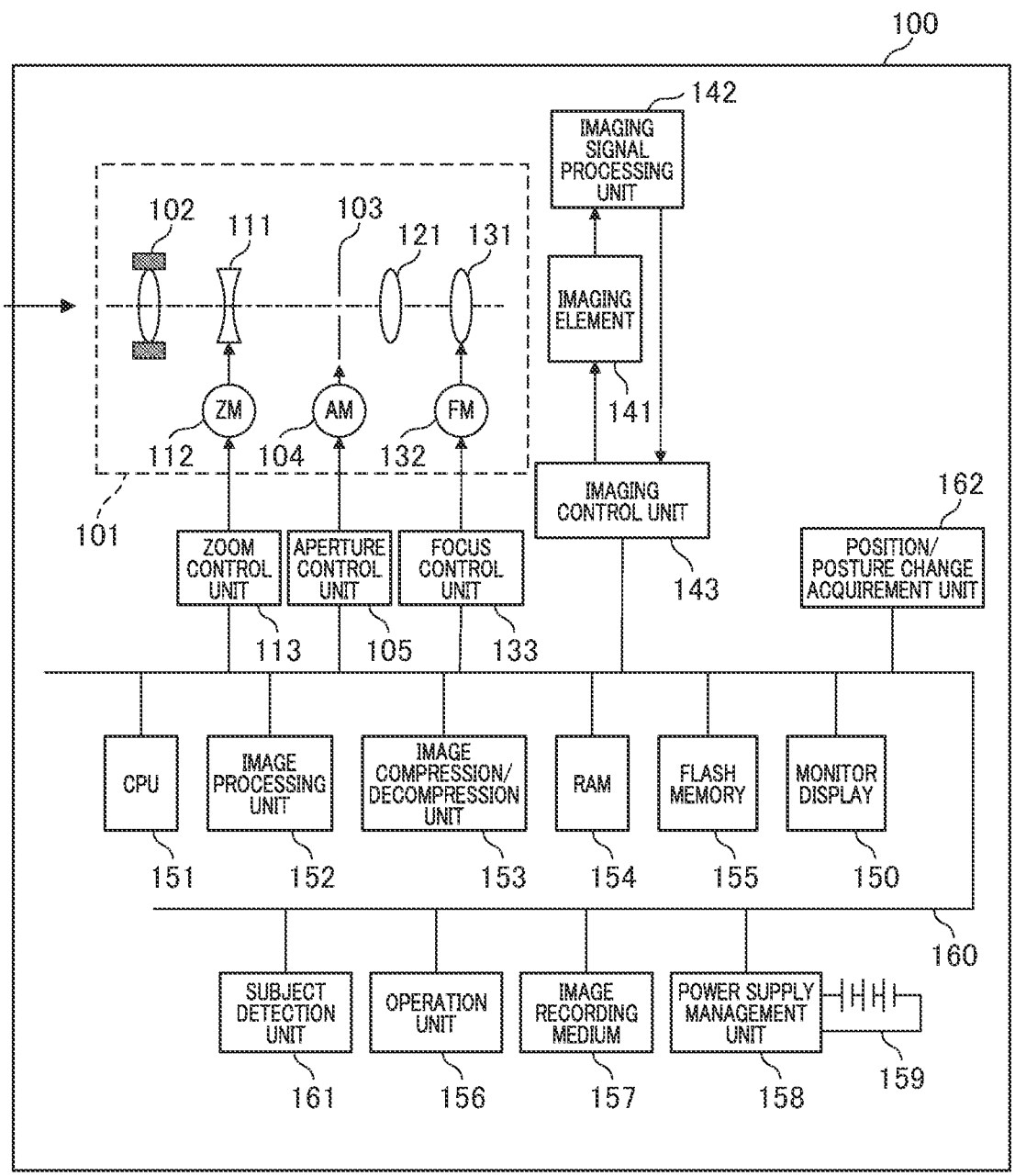
FIG. 1 is a block diagram illustrating a configuration of an imaging device of Embodiment 1.

FIG. 1 is a block diagram illustrating a functional configuration example of an imaging device 100 in the present embodiment. The imaging device 100 is a digital still camera, a video camera, or the like, capable of capturing an image of a subject and recording data of a moving image and a still image in a recording medium. Units in the imaging device 100 are connected to each other through a bus 160. Each of the units is controlled by a central processing unit (CPU) 151 that constitutes a control unit. The CPU performs the following processing and control by executing a program.

An imaging lens unit 101 includes an optical member such as a fixed lens or a movable lens that constitutes an imaging optical system. FIG. 1 shows a configuration including a first fixed group lens 102, a zoom lens (a lens for variable magnification) 111, an aperture 103, a third fixed group lens 121, and a focus lens (a lens for focus adjustment) 131. Meanwhile, for convenience of description, the lenses 102, 111, 121, and 131 are shown as one lens, but these lenses may each be composed of a plurality of lenses. In addition, the imaging lens unit 101 may be configured as a detachable interchangeable lens.

An aperture control unit 105 adjusts the opening diameter of the aperture 103 to control light amount adjustment during image capture by driving the aperture 103 through an aperture motor (AM) 104 in accordance with a command of the CPU 151. A zoom control unit 113 changes the focal length of the imaging lens unit 101 by driving the zoom lens 111 through a zoom motor (ZM) 112.

A focus control unit 133 controls driving of a focus motor (FM) 132. The focus control unit 133 calculates the defocus amount and the defocus direction of the imaging lens unit 101 on the basis of a phase difference between a pair of signals for focus detection (an A image signal and a B image signal) obtained from an imaging element 141. The focus control unit 133 converts the defocus amount and the defocus direction into the driving amount and the driving direction of the focus motor (FM) 132. The focus control unit 133 controls the operation of the focus motor (FM) 132 on the basis of the driving amount and the driving direction, and controls the focus state of the imaging lens unit 101 by driving the focus lens 131. In this way, the focus control unit 133 performs automatic focus detection and adjustment (phase difference AF) of a phase difference detection type. Alternatively, the focus control unit 133 calculates a contrast evaluation value from an image signal acquired from the imaging element 141 and executes AF control of a contrast detection type.

Light from a subject is imaged on the imaging element 141 through the imaging lens unit 101. The imaging element 141 performs photoelectric conversion on a subject image (optical image) formed by an imaging optical system and outputs an electrical signal. Each of a plurality of pixel units arranged in the imaging element 141 has a photoelectric conversion unit. For example, in the imaging element 141, m pixels in a horizontal direction and n pixels in a vertical direction, that is, m×n pixel units, are arranged in a matrix. Each pixel unit is provided with a micro-lens and two photoelectric conversion units. Readout of a signal from the imaging element 141 is controlled by an imaging control unit 143 in accordance with a command from the CPU 151. The imaging element 141 outputs an electrical signal to an imaging signal processing unit 142.

The imaging signal processing unit 142 arranges the signal acquired by the imaging element 141 as an image signal, and performs signal processing for acquiring image data on an imaging surface. The imaging signal processing unit 142 performs signal processing such as a noise reduction process, an A/D conversion process, or an automatic gain control process. The image data that is output from the imaging signal processing unit 142 is sent to the imaging control unit 143. The imaging control unit 143 accumulates the image signal received from the imaging signal processing unit 142 in a random access memory (RAM) 154.

An image processing unit 152 applies predetermined image processing to the image data accumulated in the RAM 154. The predetermined image processing includes a signal format conversion process, a scaling process, and the like, in addition to a so-called development process such as a white balance adjustment process, a color interpolation (demosaic) process, or a gamma correction process, but there is no limitation thereto. In addition, the image processing unit 152 generates information, or the like, relating to subject luminance for use in automatic exposure control (AE). Information relating to a specific subject region within an image is supplied from a subject detection unit 161 to the image processing unit 152, and is used in, for example, a white balance adjustment process. Meanwhile, if AF control of a contrast detection type is performed, the image processing unit 152 generates an AF evaluation value. The image processing unit 152 stores the processed image data in the RAM 154.

An image compression/decompression unit 153 reads out and compresses the image data accumulated in the RAM 154, and then performs a process of recording the image data in an image recording medium 157. The image data accumulated in the RAM 154 is sent to the image processing unit 152 in parallel with this process. If the image data stored in the RAM 154 is recorded, the CPU 151 performs a process of adding a predetermined header, or the like, to the image data and generates a data file according to a recording format. In this case, the CPU 151 encodes the image data as necessary through the image compression/decompression unit 153 and performs a process of compressing the amount of information. The CPU 151 performs a process of recording the generated data file in the image recording medium 157.

A flash memory 155 stores a control program required for the operation of the imaging device 100, a set value used for the operation of each unit, GUI data, a user set value, and the like. In a case when the imaging device 100 is started up by transitioning from a power supply OFF state to a power supply ON state through a user's operation, a control program and parameters stored in the flash memory 155 are read into a portion of the RAM 154. The CPU 151 controls the operation of the imaging device 100 in accordance with the control program and constants loaded in the RAM 154.

The CPU 151 executes AE processing of automatically determining exposure conditions (shutter speed, accumulation time, aperture value, or sensitivity) on the basis of information on subject luminance. The information on subject luminance can be acquired from, for example, the image processing unit 152. The CPU 151 can also determine the exposure conditions with a region of a specific subject such as a person's face as a reference.

The CPU 151 performs exposure control according to the electronic shutter speed (accumulation time) and the magnitude of a gain. The CPU 151 notifies the imaging control unit 143 of the accumulation time and the magnitude of the gain that are determined. The imaging control unit 143 controls the operation of the imaging element 141 so that image capture according to the exposure conditions that are notified of is performed.

A monitor display 150 has a display device such as a liquid crystal display (LCD) or an organic electroluminescence (EL) display, and performs a process of displaying image data, or the like. For example, if the image data stored in the RAM 154 is displayed, the CPU 151 performs a scaling process on the image data through the image processing unit 152 so as to match the display size on the monitor display 150. The processed image data is written in a region (VRAM region) used as a video memory in the RAM 154. The monitor display 150 reads out image data for display from the VRAM region of the RAM 154 and displays the image data on the screen.

The imaging device 100 causes the monitor display 150 to function as an electronic viewfinder (EVF) by immediately displaying a captured moving image on the monitor display 150 during a still image standby state or moving image recording. A moving image and its frame image that are displayed by the monitor display 150 functioning as an EVF are referred to as a live view image or a through image. In addition, if the imaging device 100 performs still image capture, the imaging device displays a still image captured immediately before on the monitor display 150 over a constant period of time so that a user can confirm the image capture result. Control of the display operation is realized according to a command of the CPU 151.

An operation unit 156 includes switches, buttons, keys, a touch panel, a line-of-sight input device, and the like, for a user to input an operation signal to the imaging device 100. The operation unit 156 outputs an operation signal to the CPU 151 through the bus 160. The CPU 151 controls each unit in order to realize an operation according to the operation signal. The image recording medium 157 is a memory card, or the like, for recording a data file or the like in a predetermined format. A power supply management unit 158 manages a battery 159 and stably supplies power to the entirety of the imaging device 100.

The subject detection unit 161 has the following functions if an imaging target is a specific subject (for example, a person).

A part detection function of detecting each part of a specific subject such as the face or trunk.

A priority part determination function of determining a priority part from a detected part.

An extension function of extending a part which is not detected as a part of a subject by the part detection function as a priority part.

The detection result of the subject detection unit 161 can be used in, for example, automatic setting of a focus detection region. As a result, it is possible to realize a tracking AF function for a specific subject region. In addition, AE processing is performed on the basis of information on the luminance of a focus detection region, and image processing (such as, for example, a gamma correction process or a white balance adjustment process) is performed on the basis of the pixel value of the focus detection region. Meanwhile, the CPU 151 superimposes an index indicating the current position of a subject region on a display image and performs a process of displaying the index on the monitor display 150. The index is, for example, a rectangular frame, or the like, surrounding a subject region. Meanwhile, the details of the configuration and operation of the subject detection unit 161 will be described later.

A position/posture change acquirement unit 162 includes, for example, a position/posture sensor such as a gyro sensor, an acceleration sensor, or an electronic compass, and measures a change in position/posture with respect to the imaging scene of the imaging device 100. Acquired data of the change in position/posture is stored in the RAM 154 and is referenced by the subject detection unit 161.

Figure 2:
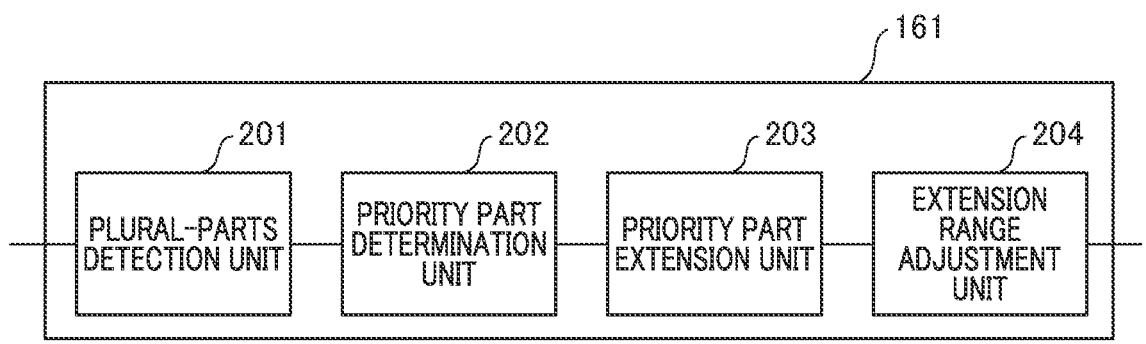
FIG. 2 is a block diagram illustrating a configuration of a subject detection unit of Embodiment 1.

The configuration of the subject detection unit 161 will be described with reference to FIG. 2. FIG. 2 is a block diagram illustrating a functional configuration example of the subject detection unit 161. The subject detection unit 161 includes a plural-parts detection unit 201, a priority part determination unit 202, a priority part extension unit 203, and an extension range adjustment unit 204.

The plural-parts detection unit 201 sequentially acquires a time-series image signal from the image processing unit 152 and detects at least two parts of a subject that are imaging targets included in each image. The detection result includes information such as region information, coordinate information, or reliability within an image. The region information includes information indicating a range, an area, a boundary, or the like. The coordinate information that is position information includes information on coordinate points and coordinate values.

The priority part determination unit 202 determines a prioritized part (priority part) among the parts of a subject detected by the plural-parts detection unit 201. The priority part extension unit 203 extends the region of the subject from the priority part determined by the priority part determination unit 202. The priority part extension unit 203 uses the extended region as the extended region of the priority part.

The extension range adjustment unit 204 adjusts the range of the extended region extended by the priority part extension unit 203. The information on the region extended by the priority part extension unit 203 and then adjusted by the extension range adjustment unit 204 is used for various processes by the CPU 151, or the like.

Figure 3:
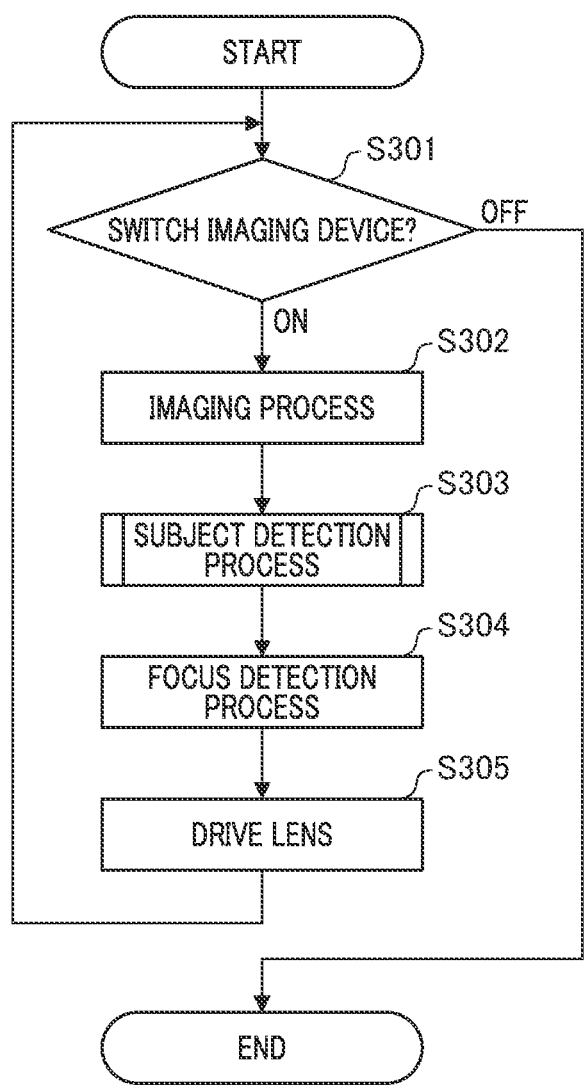
FIG. 3 is a flowchart of an overall process of Embodiment 1.

The operation accompanied by a subject detection process in the imaging device 100 will be described with reference to the flowchart of FIG. 3. The following processes are realized by the CPU 151 executing a program.

In S301, the CPU 151 determines whether the power supply of the imaging device 100 is turned on or turned off. If it is determined that the power supply is turned off, the process is ended, and if it is determined that the power supply is turned on, the process proceeds to S302. In S302, the CPU 151 executes an imaging process for one frame. The imaging element 141 generates a pair of pieces of parallax image data and data of a captured image for one screen. The parallax image is constituted by a plurality of viewpoint images having different viewpoints. For example, the imaging element 141 includes a plurality of micro-lenses and a plurality of photoelectric conversion units corresponding to each micro-lens. An A image signal is acquired from a first photoelectric conversion unit of each pixel unit, and a B image signal is acquired from a second photoelectric conversion unit. Viewpoint image data based on the A image signal and the B image signal is generated. The generated data is stored in the RAM 154. Next, the process proceeds to S303.

In S303, the CPU 151 executes subject detection through the subject detection unit 161. The details of the subject detection process will be described later. The subject detection unit 161 notifies the CPU 151 of detection information such as the position, size, or the like, of the subject region. The detection information is stored in the RAM 154. The CPU 151 sets a focus detection region on the basis of the subject region that is notified of. Next, the process proceeds to S304.

In S304, the CPU 151 causes the focus control unit 133 to execute a focus detection process. The focus control unit 133 acquires a signal for focus detection from a plurality of pixel units included in the focus detection region in a pair of parallax images. The A image signal is generated from a signal obtained from the first photoelectric conversion unit within a plurality of pixel units arranged in the same row, and the B image signal is generated from a plurality of signals obtained from the second photoelectric conversion unit. The focus control unit 133 calculates the amount of correlation between the A image and the B image while shifting the relative positions of the A image and B image, and obtains a relative position at which the degree of similarity between the A image and the B image is highest as a phase difference (shift amount) between the A image and the B image. Further, the focus control unit 133 converts the phase difference into the defocus amount and the defocus direction. Next, the process proceeds to S305.

In S305, the focus control unit 133 drives the focus motor (FM) 132 in accordance with a lens driving amount and a driving direction corresponding to the defocus amount and the defocus direction obtained in S304. A focus adjustment operation is performed by controlling the movement of the focus lens 131. If the lens driving process ends, the process returns to S301.

Thereafter, the processes of S302 to S305 are repeatedly executed until it is not determined in S301 that a power-supply switch is turned on. Meanwhile, although it is assumed that the subject detection process is executed for every frame in FIG. 3, the subject detection process may be performed for every several frames for the purpose of reducing a processing load or power consumption.

Processes that are performed by the subject detection unit 161 will be described with reference to the flowchart of FIG. 4 and FIG. 5. First, in S401, an input image is supplied from the imaging control unit 143 to the subject detection unit 161.

In S402, the plural-parts detection unit 201 detects the parts of the subject with respect to the image which is input from the imaging control unit 143. There are at least two parts detected in this case. Information on the detection result includes region information and coordinate information in the image. There is also other information such as reliability. A known method is used for a part detection method. For example, there is a method of detecting a specific subject using a feature extraction process based on convolutional neural networks (hereafter referred to as CNNs). In addition, there is a method in which a subject that is a detection target or a part of the subject is registered as a template in advance and a process of detecting the part is performed using template matching. An example is shown with reference to FIG. 5. FIG. 5 is a schematic diagram illustrating detection of the parts of a subject. An example is shown in which two parts, that is, a face detection region 501 and a trunk detection region 502, are detected in a person who is a subject.

Figure 4:
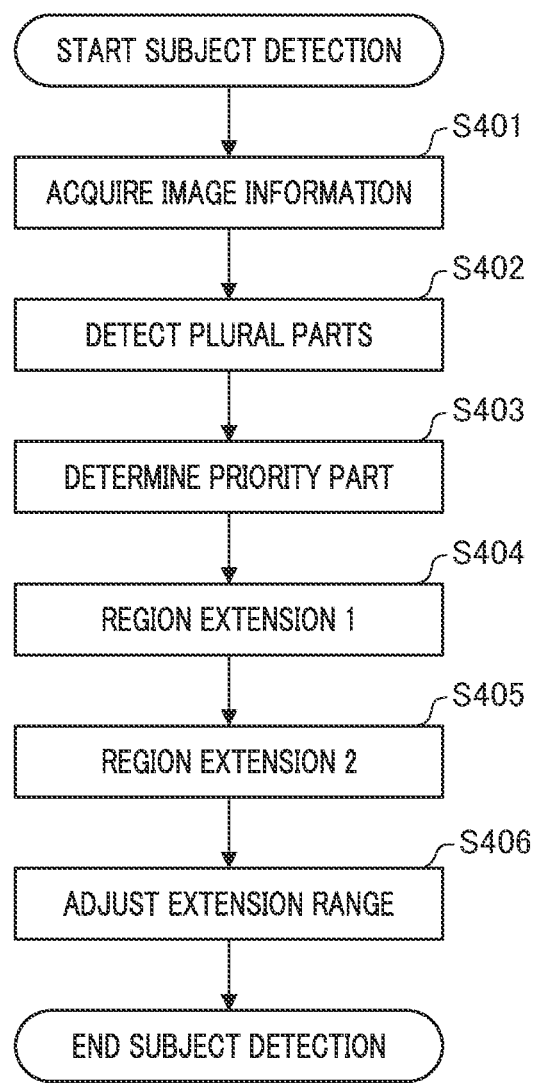
FIG. 4 is a flowchart of subject detection of Embodiment 1.
Figure 5:
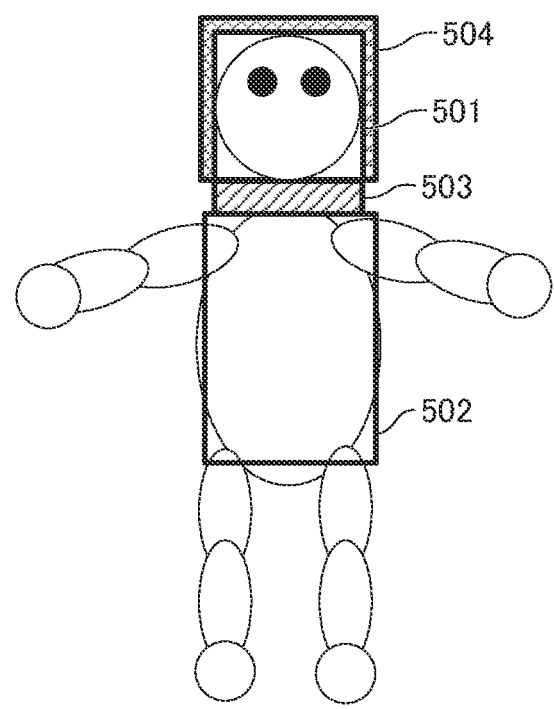
FIG. 5 is a diagram related to a region extension of Embodiment 1.

In S403 of FIG. 4, the priority part determination unit 202 determines a prioritized part from the plurality of parts detected in S402. Regarding a method of determining a priority part, in the present embodiment, it is assumed that the priority part is determined in accordance with a set value that is set in advance by a user through the operation unit 156. For example, if face priority is set, the face detection region 501 is determined as the priority part in the example of FIG. 5. Meanwhile, the method of determining a priority part is not limited to a setting based on a user's operation, and there is, for example, a method of determining a part having a high reliability calculated in S402 as the priority part.

In S404, the priority part extension unit 203 performs a first extension process for a region. The region is extended from the priority part determined in S403 toward a part that is not determined to be priority. In the example of FIG. 5, an extension process from the face detection region 501, which is a priority part toward the trunk detection region 502, which is not a priority part to a region 503 is performed.

In S405, the priority part extension unit 203 performs a second extension process for a region and extends the region in a direction different from that of the region extended in S404. In the example of FIG. 5, the region is extended from the face detection region 501, which is a priority part in directions different from that of the region 503 (3 directions), and a region 504 is acquired. The extension range of the region 504 is narrower than the extension range of the region 503 extended in S404.

The region extended in S404 and S405 is handled as an extended region of the priority part. In the example of FIG. 5, the region 503 and the region 504 are handled as extended regions of the face detection region 501 which is a priority part. For example, if a user designates a subject by touching the region 503 or inputting the line of sight through the operation unit 156, the CPU 151 determines that the face of the person (the detection region 501) has been designated, and executes an extension process corresponding to the face detection region 501.

In S406, the extension range adjustment unit 204 performs a process of adjusting the extension range of the region extended in S404 and S405. For example, the extension range adjustment unit 204 can estimate a camera shake on the basis of information on the movement of the imaging device acquired by the position/posture change acquirement unit 162 and adjust the extension range in accordance with the camera shake. As the camera shake increases, it becomes difficult to accurately designate a subject. Therefore, the extension range adjustment unit 204 makes it easy to designate a priority part by enlarging the extended region. As another example, it is assumed that a user designates a subject by inputting the line of sight through the operation unit 156. Since there is the possibility of a variation occurring due to the nature of the line of sight even if a fixed point is gazed at steadily, it is difficult to accurately designate a subject using the line of sight alone. The extension range adjustment unit 204 makes it easy to designate a priority part by adjusting the extension range on the basis of a variation in the position of the line of sight. A method of estimating a camera shake and a method of estimating a variation in the position of the line of sight are known, and thus a detailed description thereof will be omitted.

In the present embodiment, the case when the face and trunk of a person are the parts of a specific subject has been described. Without being limited thereto, the present embodiment can be applied to the detection of the face and trunk of an animal such as a cat or parts of an inanimate object such as an automobile (such as a headlamp and a hood), and can also be applied to the detection of a combination of a living thing and an inanimate object such as a person riding a two-wheeled vehicle and the two-wheeled vehicle itself. A subject that is a detection target and its part are not particularly limited. This also applies to embodiments to be described later.

According to the present embodiment, a part that cannot be detected in the subject detection process can be regarded as an extended region of the detected subject and be processed. When a subject displayed on a display unit (such as a rear liquid crystal display unit or an EVF) is designated by a user through a touch operation, the line of sight, or the like, there is a possibility that a part that cannot be detected may be erroneously designated due to the influence of a camera shake, a variation at the time of designation, or the like. Even in such a case, a designation based on the detected part is possible. For example, if a user designates a region erroneously, the imaging device can determine that the user has designated the region when the designated region is included in the extended region.

Embodiment 2

Next, Embodiment 2 of the present invention will be described. In the present embodiment, common components and processes with respect to those in Embodiment 1 will not be described in detail by the already used reference numerals and signs, or the like, being applied thereto. Differences will be mainly described. Such a description omission method is the same in embodiments and modification examples to be described later.

Figure 6:
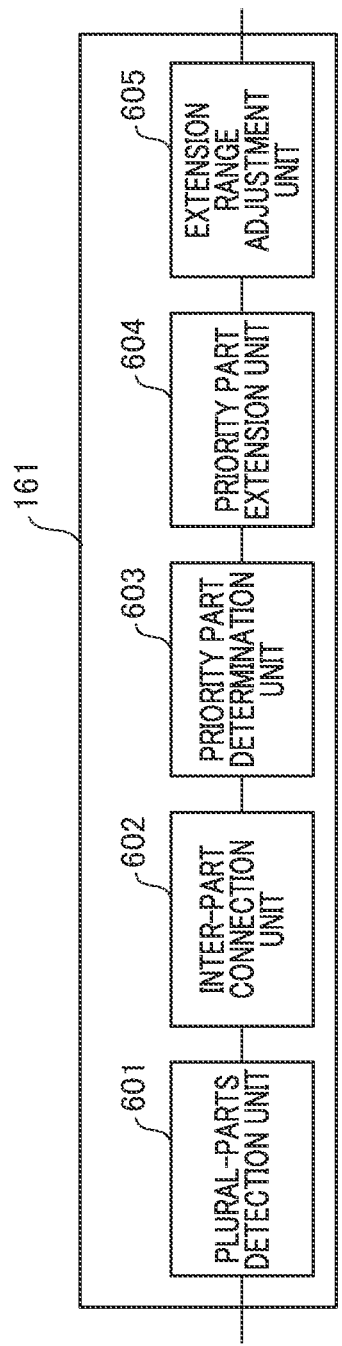
FIG. 6 is a block diagram illustrating a configuration of a subject detection unit of Embodiment 2.

FIG. 6 is a block diagram illustrating a functional configuration example of the subject detection unit 161 of the present embodiment. The subject detection unit 161 includes a plural-parts detection unit 601, an inter-part connection unit 602, a priority part determination unit 603, a priority part extension unit 604, and an extension range adjustment unit 605. A difference from Embodiment 1 is that the inter-part connection unit 602 is added.

The plural-parts detection unit 601 is sequentially supplied with image signals in a time series from the image processing unit 152. The plural-parts detection unit 601 detects at least two parts of a subject that is an imaging target included in each image. Information on the detection result includes information such as region information, coordinate information, or reliability within an image.

The inter-part connection unit 602 performs a process of connecting parts of the same subject among parts detected by the plural-parts detection unit 601. The priority part determination unit 603 determines a part that is prioritized as a subject among the parts detected by the plural-parts detection unit 601. The priority part extension unit 604 calculates the extended region of the priority part determined by the priority part determination unit 603. The extension range adjustment unit 605 adjusts the range of the extended region extended by the priority part extension unit 203.

Processes that are performed by the subject detection unit 161 will be described with reference to the flowchart of FIG. 7 and FIGS. 8A and 8B. First, in S701, an input image is supplied from the imaging control unit 143 to the subject detection unit 161.

In S702, the plural-parts detection unit 601 detects the parts of the subject with respect to the image which is input from the imaging control unit 143. The plural-parts detection unit 601 detects at least two parts. The detection result includes region information and coordinate information within the image. Other information such as reliability may be included. FIGS. 8A and 8B are schematic diagrams illustrating a detection example of the parts of a person who is a specific subject. In the example of FIG. 8A, a detection region 801 which is a person's face and centroid coordinates 802, and a detection region 803 which is the person's trunk and centroid coordinates 804 are detected as two parts.

Figure 7:
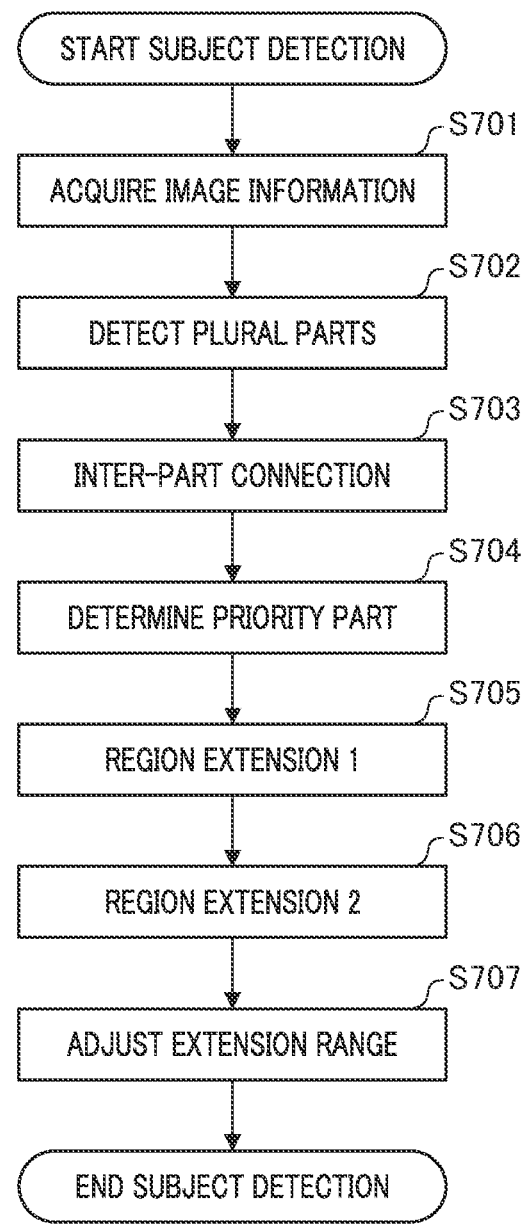
FIG. 7 is a flowchart of subject detection of Embodiment 2.
Figure 8A:
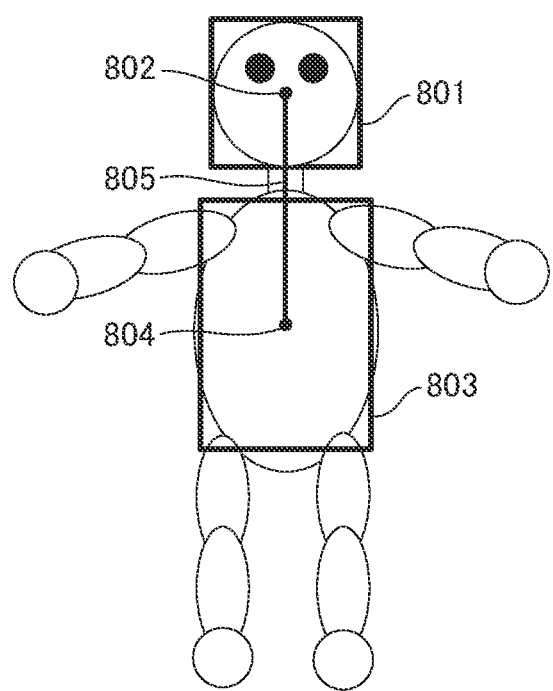
FIGS. 8A and 8B are diagrams related to region extension of Embodiment 2.
Figure 8B:
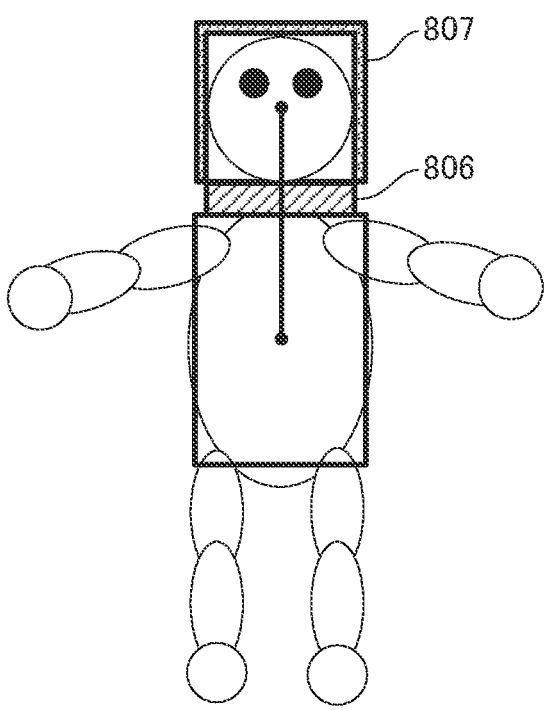

In S703 of FIG. 7, the inter-part connection unit 602 performs a process of connecting the parts of the same subject among the plurality of parts detected in S702. In the example of FIG. 8A, the point of the centroid coordinates 802 of the face and the point of the centroid coordinates 804 of the trunk are connected to each other by a connection unit 805. The detailed description of an inter-part connection method will be described later.

In S704, the priority part determination unit 603 determines a priority part from the plurality of parts detected in S702. A method of determining a priority part is the same as S403 of FIG. 4. In FIGS. 8A and 8B, the face of the person is determined as the priority part. In S705, the priority part extension unit 604 extends the region from the priority part determined in S704 toward the direction of connection in S703. In the example of FIG. 8B, the region is extended from the detection region 801 corresponding to the face of a person who is a priority part in the direction of the connection unit 805. An extended region 806 in this case is a region between the detection region 801 of the face and the detection region 803 of the trunk.

In S706, the priority part extension unit 604 extends the region in a direction different from that of the region extended in S705. In the example of FIG. 8B, the region is extended from the detection region 801 of the face that is a priority part in directions different from that of the connection unit 805 (3 directions). An extended region 807 in this case is a region in which the detection region 801 of the face is extended in a direction opposite to the direction of the connection unit 805 and two directions orthogonal to the direction of the connection unit 805. The extension range of the region 807 is narrower than the extension range of the region extended in S705. In S707, the extension range adjustment unit 605 adjusts the extension range of the region extended in S705 and S706. An adjustment method is the same as S406 of FIG. 4.

Figure 9:
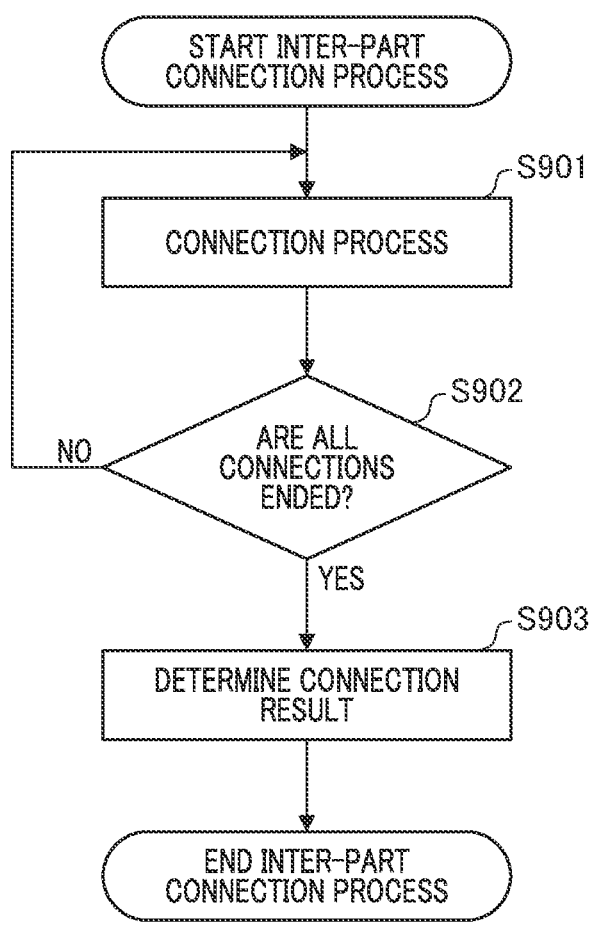
FIG. 9 is a flowchart of an inter-part connection process of Embodiment 2.
Figure 10:
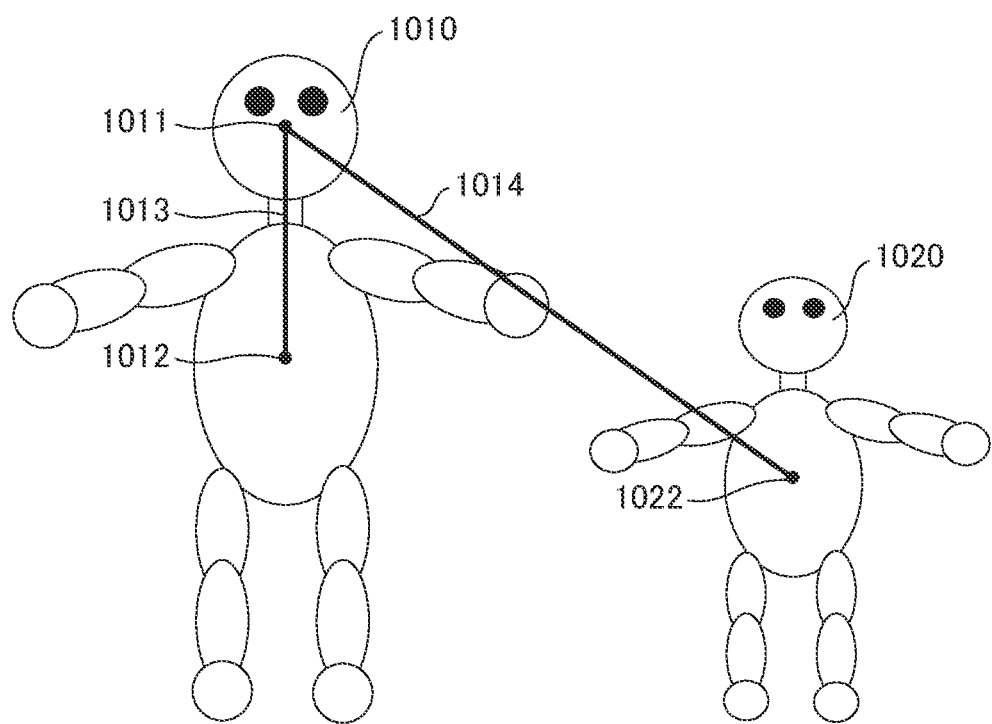
FIG. 10 is a diagram related to the inter-part connection process of Embodiment 2.

The inter-part connection method in S703 of FIG. 7 will be described with reference to FIGS. 9 and 10. FIG. 9 is a flowchart of an inter-part connection process. FIG. 10 is a schematic diagram illustrating a situation in which there are two persons 1010 and 1020 within an image. A face centroid 1011, a trunk centroid 1012, and a connection unit 1013 of the person 1010 and a trunk centroid 1022 of the person 1020 are shown. There are two sets of each part in the part reflected in the screen. An example is shown in which the face centroid 1011 of the person 1010 in FIG. 10 is used as a connection source and the trunk centroid 1012 is used as a connection destination.

In S901 of FIG. 9, the inter-part connection unit 602 performs the inter-part connection process. A process of searching for one connection destination from the connection source and making a connection is executed. In S902, the inter-part connection unit 602 searches the entire screen and determines whether the connection destination has been searched. If it is determined that the search for the connection destination has ended, the process proceeds to S903, and if it is determined that the search for the connection destination has not ended, the process returns to S901 and the connection process is continued.

In the example of FIG. 10, the trunk centroid 1012 of the person 1010 and the trunk centroid 1022 of the person 1020, that is, two centroids, are detected. The processes of S901 and S902 in FIG. 9 are repeatedly executed twice. The connection unit 1013 shows the result of connection from the face centroid 1011 of the person 1010 to the trunk centroid 1012. In addition, a connection unit 1014 shows the result of connection from the face centroid 1011 of the person 1010 to the trunk centroid 1022 of the person 1020.

In S903 of FIG. 9, the inter-part connection unit 602 evaluates each result of connection in S901 and S902 and determines one connection source. As a method of evaluating a connection result, for example, there is a method of selecting a connection destination having a short distance between the connection source and the connection destination on the image plane. In addition, there is a method of comparing information on the depth of the connection source with information on the depth of the connection destination and selecting a connection destination having the smallest depth difference. In the example of FIG. 10, the distance between the face centroid 1011 and the trunk centroid 1012 on the image plane is shorter than the distance between the face centroid 1011 and the trunk centroid 1022 on the image plane. As a result, the inter-part connection unit 602 selects the connection unit 1013 and determines to connect the face centroid 1011 and the trunk centroid 1012 of the person 1010. After S903, the inter-part connection process ends.

In the present embodiment, an example in which there are two persons within the image and there are two sets of two points, that is, the face centroid and the trunk centroid, has been described. Without being limited to this example, the present embodiment can be applied even if the number of persons increases, and the type of part such as the shoulder centroid or arm centroid of a person and the number of detections do not matter. Regarding the processes of S901 to S903 in FIG. 9, since the connection destination and the connection source are changed and the processes equal in number to detections are repeatedly executed, the inter-part connection process can be performed with respect to all detected parts and the number of all persons.

In addition, in the present embodiment, an example in which the connection source and the connection destination are searched for in order and then the inter-part connection process is performed has been illustrated. Without being limited to this example, the CNN may be used to perform a connection process based on the feature extraction process with the connection source and the connection destination as inputs.

According to the present embodiment, in a situation when a plurality of subjects are detected within an image, a plurality of parts detected apart from each other can be connected to each other, and a non-detection region can be regarded as a portion of the detected subject on the basis of the connection result. Even if a user designates a point between a plurality of parts that are non-detection regions, the imaging device can determine that the designated region has been designated by a user when the region is included in the extended region.

Embodiment 3

A third embodiment of the present invention will be described with reference to FIGS. 11, 12A, and 12B. The functional configuration of the subject detection unit 161 in the present embodiment is the same as that in FIG. 6, but at least one part (a first part) that is detected by the plural-parts detection unit 601 has region information and coordinate information within an image. In addition, a second part has no region information within the image and has only the coordinate information.

The processes of the subject detection unit 161 will be described with reference to the flowchart of FIG. 11 and FIGS. 12A and 12B. FIGS. 12A and 12B are schematic diagrams illustrating a process of detecting a person's joint that is a specific subject. The first part that is detected in the present example is the face of a person and has each piece of information of a region 1301 and coordinates 1302. In addition, a chest 1303, a left hand 1304, a right hand 1305, a left foot 1306, and a right foot 1307 that are equivalent to the second part each has only coordinate information.

Figure 11:
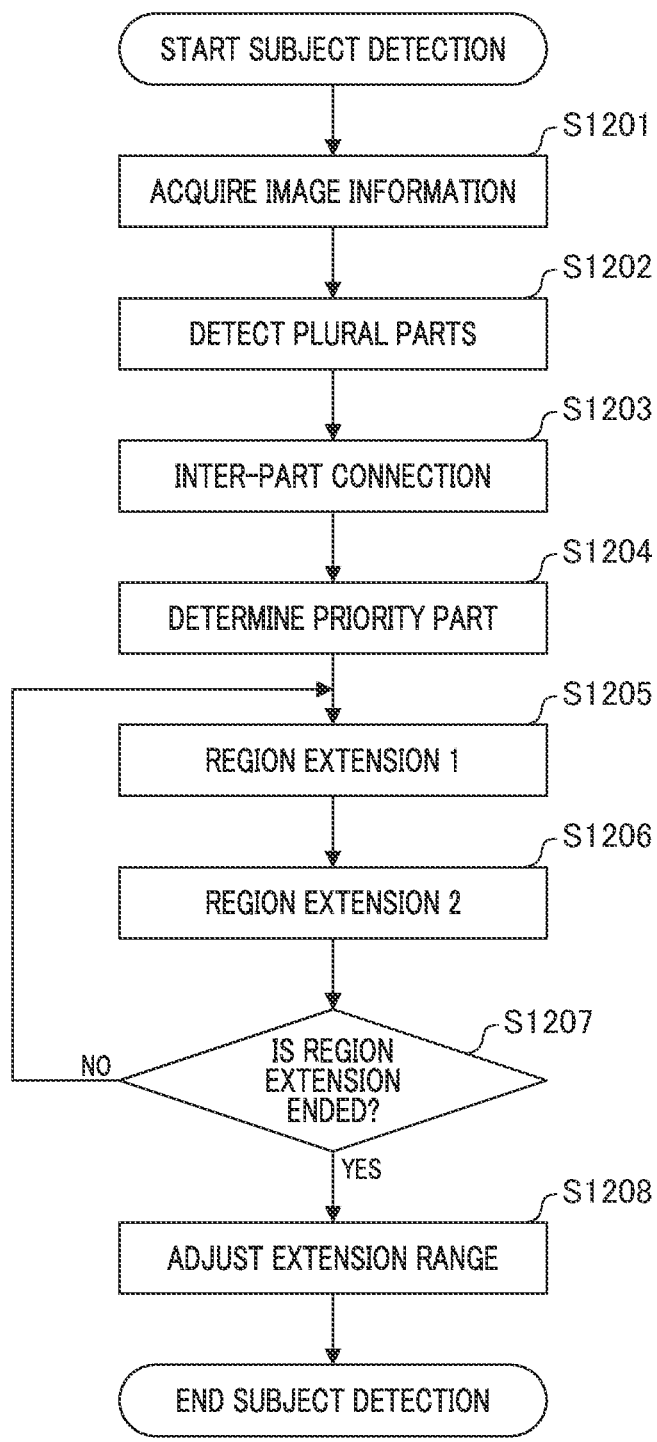
FIG. 11 is a flowchart of subject detection of Embodiment 3.
Figure 12A:
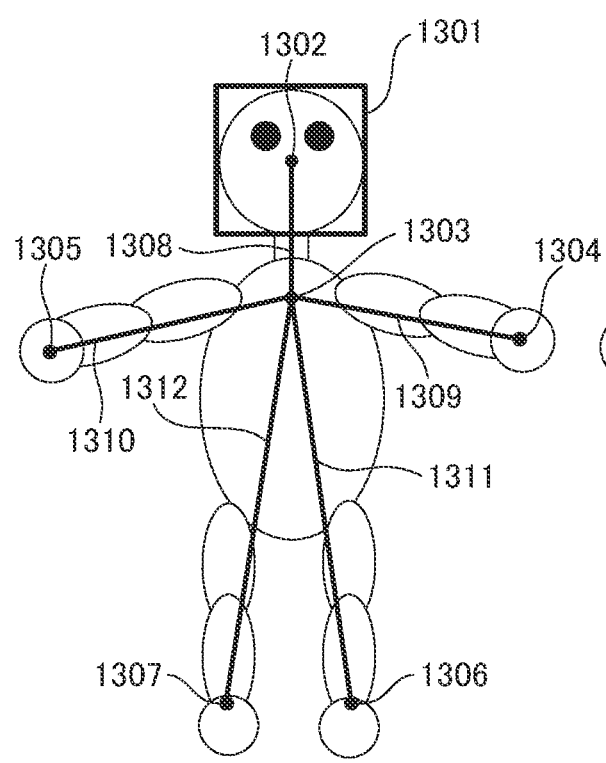
FIGS. 12A and 12B are diagrams related to region extension of Embodiment 3.
Figure 12B:
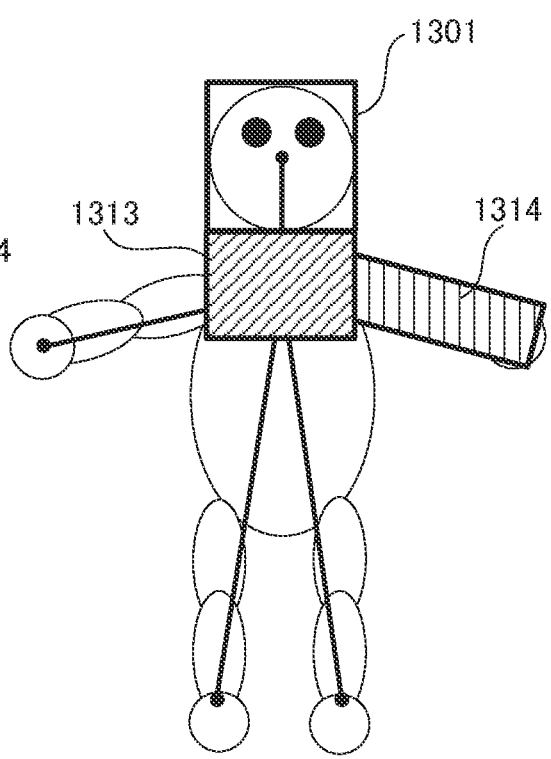

First, in S1201 of FIG. 11, an input image is supplied from the imaging control unit 143 to the subject detection unit 161. In S1202, the plural-parts detection unit 601 detects at least two parts of the subject with respect to the image that is input from the imaging control unit 143. The first part includes region information and coordinate information within the image. The second part includes only the coordinate information within the image. Specifically, in FIG. 13(A), the face that is the first part has each piece of information on the region 1301 and the coordinates 1302. The chest (1303) and the four limbs (1304 to 1307) each has only the coordinate information.

In S1203, the inter-part connection unit 602 performs a process of connecting the parts of the same subject among the plurality of parts detected in S1202. In the example of FIG. 12A, the point of the coordinates 1302 of the face centroid and the coordinate point of the chest 1303 are connected to each other by a connection unit 1308. In the same way, the following connection processes are performed.

- A process of connecting the coordinate point of the chest 1303 and the coordinate point of the left hand 1304 using a connection unit 1309.
- A process of connecting the coordinate point of the chest 1303 and the coordinate point of the right hand 1305 using a connection unit 1310.
- A process of connecting the coordinate point of the chest 1303 and the coordinate point of the left foot 1306 using a connection unit 1311.
- A process of connecting the coordinate point of the chest 1303 and the coordinate point of the right foot 1307 using a connection unit 1312.

In S1204 of FIG. 11, the priority part determination unit 603 determines a priority part from the plurality of parts detected in S1202. As the priority part, any of the parts is determined from the parts having region information. In the example of FIG. 12A, a face having information on the region 1301 and the coordinates 1302 is determined as the priority part. If there are a plurality of parts having region information, it is possible to make a determination according to a designation based on a user's operation, similarly to S403 of FIG. 4. In addition, according to the coordinate designation, such as a touch operation or a line-of-sight input performed by a user through the operation unit 156, a part having a short distance on the image plane can be determined as the priority part.

In S1205, the priority part extension unit 604 performs a region extension process from the priority part determined in S1204 toward the direction of connection in S1203. In the example of FIG. 12B, the region is extended from the region 1301 of the face that is a priority part in the direction of the connection unit 1308. That is, an extended region 1313 adjacent to the region 1301 is acquired.

In S1206, the priority part extension unit 604 performs further the region extension process from the region extended in S1205 toward the direction of connection in S1203. In the example of FIG. 12B, the region is extended from the extended region 1313 in the direction of the connection unit 1309. That is, an extended region 1314 adjacent to the region 1313 is acquired.

In S1207, a process of determining whether the region extension process of S1205 and S1206 has been performed is executed with respect to all the parts having no region information. If it is determined that the region extension process is completed, the process proceeds to S1208. If it is determined that the region extension process is not completed, the process returns to S1205 and the region extension process is repeatedly executed.

In S1208, the extension range adjustment unit 605 performs a process of adjusting the extension range of the region extended in S1205 and S1206. Thereafter, the subject detection process ends.

According to the present embodiment, even if a part having no region information such as the joint of an animal is detected, the region can be extended from the priority part on the basis of the connection result. For example, if a user designates a region erroneously, the imaging device can determine that the user has designated the region when the designated region is included in the extended region.

Modification Example of Embodiment 3

A modification example of Embodiment 3 will be described with reference to the flowchart of FIG. 13 and FIGS. 14A and 14B. In the modification example, an example of a process of using the reliability of an inter-part connection is illustrated. The configuration of the subject detection unit in the modification example is the same as that in FIG. 6. FIGS. 14A and 14B are schematic diagrams illustrating detection of two persons 1510 and 1520 within an image, and show an example of a process of connecting the face, chest, and four limbs of each subject within the image. The processes of S1201 to 1203 in FIG. 13 have been described with reference to FIG. 11, and the process proceeds to S1401 after S1203.

In S1401, the inter-part connection unit 602 calculates the reliability of connection with respect to the connection unit between the parts connected in S1203. For example, there is a method of calculating reliability based on the continuity of a straight line from the connection source to the connection destination. As a method of calculating continuity, for example, there is a method of using a depth map indicating the distribution of depth value within an image. It is possible to acquire a depth value on a path connected from the connection source to the connection destination from the depth map and to calculate reliability based on the variance value of the acquired depth value. Regarding the depth map, for example, there is a method of dividing light from a subject into pupils to generate a plurality of viewpoint images (parallax images), calculating the amount of parallax, and acquiring information on the depth distribution of the subject. A pupil division type imaging element includes a plurality of micro-lenses and a plurality of photoelectric conversion units corresponding to each micro-lens, and can output a signal of a different viewpoint image from each photoelectric conversion unit. The information on the depth distribution of the subject includes data indicating a distance (subject distance) from the imaging unit to the subject as a distance value of an absolute value and data indicating a relative distance relationship (image depth) in image data (such as parallax amount distribution data). The direction of depth is equivalent to the direction of depth with the imaging device as a reference. A plurality of pieces of viewpoint image data can also be acquired by multi-eye camera having a plurality of imaging units.

A process of calculating reliability will be described in detail with reference to FIG. 14A. In FIG. 14A, a linear connection unit 1513 shows the result of connection from a chest 1511 of a left person 1510 within the image to a left hand 1512. In addition, a connection unit 1523 shows the result of connection from a chest 1521 of a right person 1520 within the image to a right hand 1522. In the connection unit 1523 of the person 1520, the continuity of the straight line is lowered due to the occlusion occurring in the middle caused by the left hand of the person 1510. Compared with the connection unit 1513 in which the occlusion does not occur, the reliability of connection in the connection unit 1523 is calculated to have a lower value.

Figure 13:
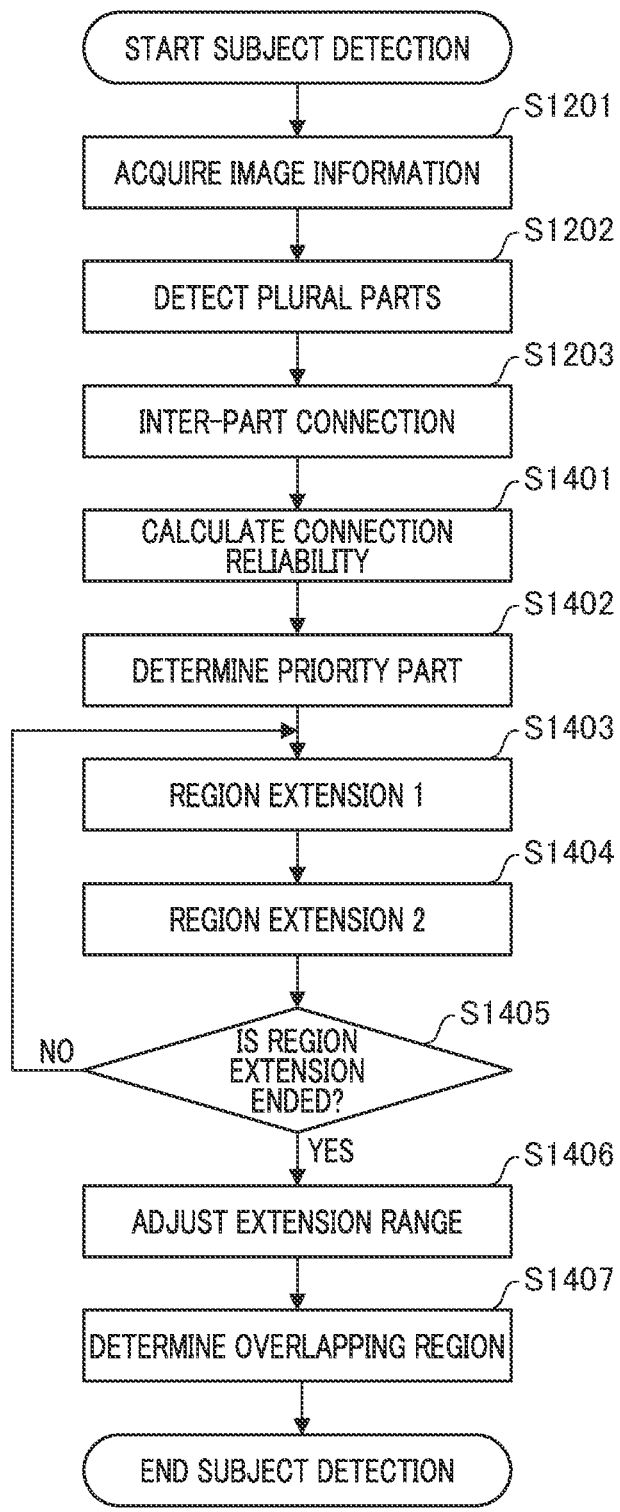
FIG. 13 is a flowchart of subject detection of a modification example of Embodiment 3.
Figure 14A:
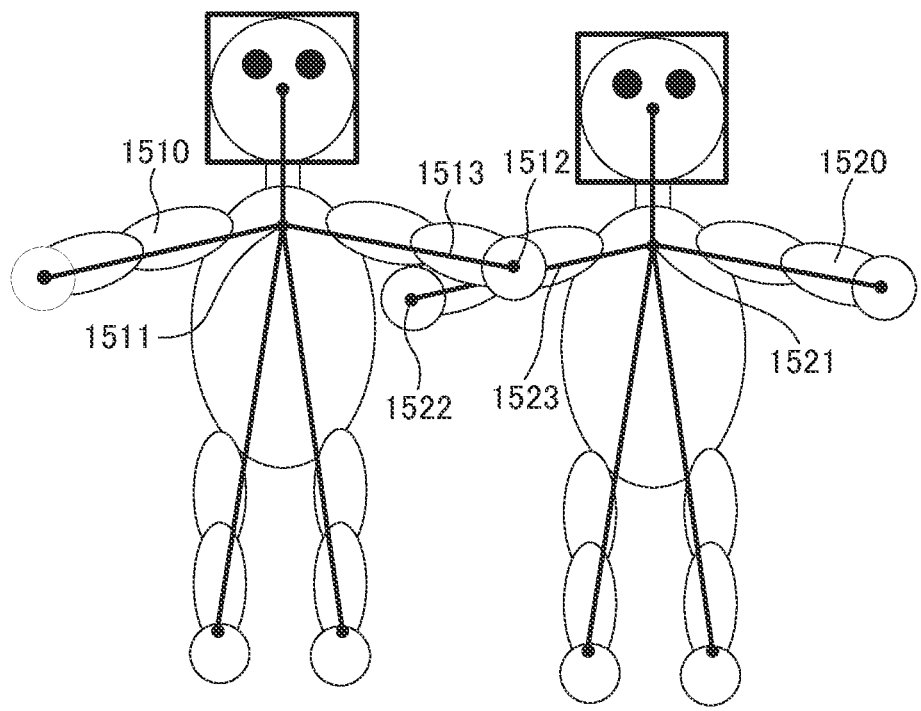
FIGS. 14A and 14B are diagrams related to region extension of the modification example of Embodiment 3.
Figure 14B:
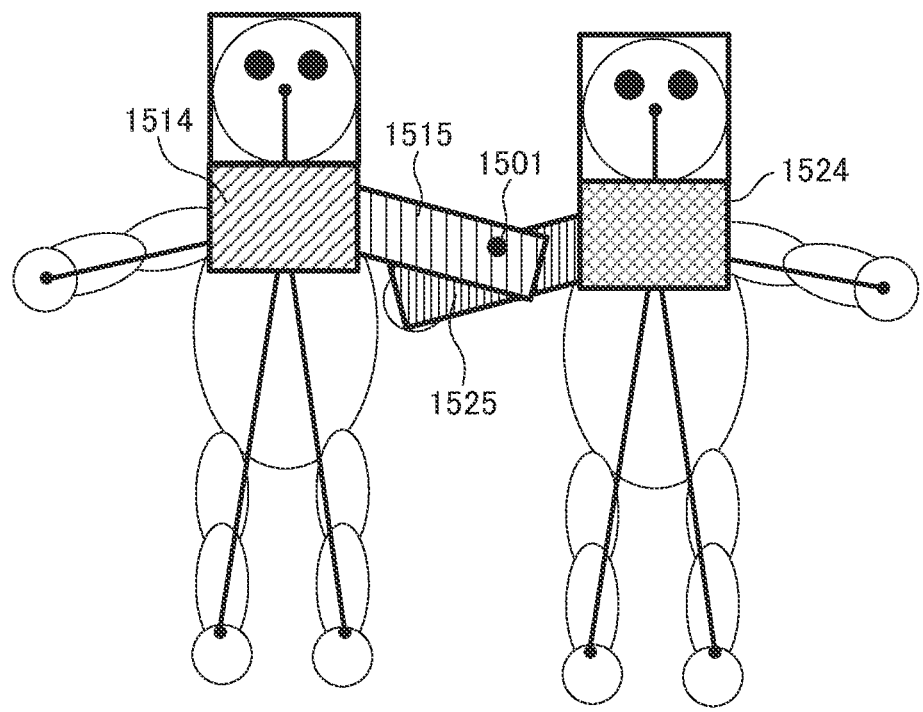

In S1402 of FIG. 13, the priority part determination unit 603 determines a priority part from the plurality of parts detected in S1202. For example, a case when the face is determined as a priority part is assumed. In FIG. 14A, since there are two persons 1510 and 1520 within the image, the faces of the persons are determined as two priority parts.

In S1403, the priority part extension unit 604 performs the region extension process from the priority part determined in S1402 toward the direction of connection in S1203. In the example of FIG. 14B, extended regions 1514 and 1524 are acquired from the detection regions of the faces of the persons 1510 and 1520.

In S1404, the priority part extension unit 604 further performs the region extension process from the region extended in S1403 toward the direction of connection in S1203. In the example of FIG. 14B, the extension process from the region 1514 to a region 1515 and the extension process from the region 1524 to a region 1525 are performed.

In S1405, a process of determining whether the region extension process of S1403 and S1404 has been performed is executed with respect to all the parts having no region information. If it is determined that the region extension process is completed, the process proceeds to S1406. If it is determined that the region extension process is not completed, the process returns to S1403 and the region extension process is repeatedly executed.

In S1406, the extension range adjustment unit 605 performs a process of adjusting the extension range of the region extended in S1403 and S1404. In S1407, the priority part determination unit 603 determines the priority part of the overlapping region. If it is determined that the overlap occurs in the region extended in S1403 and S1404, the priority part determination unit 603 uses the reliability of connection calculated in S1401 and determines the priority part. In the example of FIG. 14B, the region 1515 and the region 1525 are in a state where they overlap each other. Since the reliability of the connection unit 1523 is lower than that of the connection unit 1513, it is determined that the overlapping portion is the region of the person 1510. In this case, it is assumed that a user performs subject designation on coordinates 1501 of FIG. 14B by performing a touch operation, inputting the line of sight, or the like, through the operation unit 156. Since the position of the coordinates 1501 is within a region in which the region 1515 and the region 1525 overlap each other, it is determined that a user has designated the person 1510. After S1407, a series of processes ends.

According to the present embodiment, in a situation (occlusion) when a plurality of subjects are detected overlapping in an image, it is possible to designate a subject having a higher priority even if a user designates a location having no region information such as a joint.

In the related art, if a user designates a non-detection portion between the detected parts of a subject, there is a possibility of a subject frame not being displayed. On the other hand, in the embodiment, it is possible to handle a part that cannot be detected by the imaging device as an extended region of the detection part. If a user erroneously designates a region that is not a detection region, the imaging device can determine that the detection region has been designated. For example, it is possible to control display of a subject frame (such as a focus detection frame or a tracking frame) corresponding to a region including the extended region.

The technical scope of the present invention is not limited to the above-described embodiments. There is an embodiment in which the priority part is changed according to a designated position based on a user's operation or the size of a detected part. For example, a case when the face and the trunk of a subject are detected to be larger than a predetermined size is assumed. If the size of the detected part is smaller than a predetermined size (threshold), the face is determined as the priority part rather than the trunk. In addition, if the size of the detected part is equal to or larger than the predetermined size (threshold), the face or the trunk is determined as the priority part in accordance with a designated position based on a user's operation.

Hereinbefore, although the preferred embodiments of the present invention have been described, the present invention is not limited to the above-described embodiments, and can be modified and changed within the scope of the invention.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing device that acquires an image and detects a subject, the image processing device comprising:
    at least one processor and a memory holding a program that causes the processor function as:
        a detection unit configured to detect a plurality of parts related to a same subject within the image;
        a determination unit configured to determine a priority part from the plurality of parts detected by the detection unit; and
        an extension unit configured to extend a region of the subject corresponding to a first part from the first part determined as the priority part in a direction of a second part that is different from the first part among the plurality of parts.

2. The image processing device according to claim 1, wherein the extension unit performs a first extension process of extending the region in a first direction that is the direction from the first part to the second part, and a second extension process of extending a region extended by the first extension process in a second direction different from the first direction.

3. The image processing device according to claim 2, wherein an extension range of the region extended in the first extension process is wider than an extension range of the region extended in the second extension process.

4. The image processing device according to claim 1, wherein the processor further functions as:
    a designation unit configured to designate a position within the image; and
    a decision unit configured, if the region extended by the extension unit is designated by the designation unit, to decide that a part corresponding to the extended region is designated as a priority part.

5. The image processing device according to claim 1, wherein the processor further functions as an adjustment unit configured to adjust a range of the region extended by the extension unit.

6. The image processing device according to claim 5, wherein the adjustment unit acquires information on movement of an imaging unit and adjusts the range of the region extended by the extension unit based on the movement information.

7. The image processing device according to claim 1, wherein the processor further functions as a connection unit configured to connect at least the first part and a second part among the plurality of parts detected by the detection unit.

8. The image processing device according to claim 7, wherein the detection unit is further configured to detect a third part different from the first part and the second part,
    the connection unit is further configured to connect between the second part and the third part, and
    the extension unit is further configured to extend a region of the subject corresponding to the second part in a direction from the second part to the third part.

9. The image processing device according to claim 7, wherein the connection unit calculates a reliability of a connection between a plurality of parts, and,
    if a plurality of the priority parts are determined and a plurality of regions extended by the extension unit overlap each other, the determination unit uses the reliability to determine from which priority part the overlapping regions are extended.

10. An imaging device that detects a subject from an image acquired by an imaging unit, the imaging device comprising:
    at least one processor and a memory holding a program that makes the processor function as:
        a detection unit configured to detect a plurality of parts related to a same subject within the image;
        a determination unit configured to determine a priority part from the plurality of parts detected by the detection unit; and
        an extension unit configured to extend a region of the subject corresponding to a first part from the first part determined as the priority part in a direction of a second part that is different from the first part among the plurality of parts.

11. A control method executed by an image processing device that acquires an image and detects a subject, the method comprising:
    detecting a plurality of parts related to a same subject within the image;
    determining a priority part from the plurality of parts detected in the detecting; and
    extending a region of the subject corresponding to a first part from the first part determined as the priority part in a direction of a second part that is different from the first part among the plurality of parts.

12. A non-transitory recording medium storing a control program of an image processing device that acquires an image and detects a subject, causing a computer to perform each step of a control method of the image processing device, the method comprising:
    detecting a plurality of parts related to a same subject within the image;
    determining a priority part from the plurality of parts detected in the detecting; and
    extending a region of the subject corresponding to a first part from the first part determined as the priority part in a direction of a second part that is different from the first part among the plurality of parts.

13. An image processing device that acquires an image and detects a subject, the image processing device comprising
    at least one processor and a memory holding a program which makes the processor function as:

a detection unit configured to detect a plurality of parts related to a subject within the image;
a determination unit configured to determine a priority part from the plurality of parts detected by the detection unit;
an extension unit configured to extend a region of the subject from the priority part in a direction of the part detected by the detection unit; and
a connection unit configured to connect a region corresponding to a part of a same subject among the plurality of parts detected by the detection unit,
wherein the extension unit extends the region from the priority part in a direction of the part connected by the connection unit, the connection unit calculates reliability of a connection between a plurality of parts, and, if a plurality of the priority parts are determined and a plurality of regions extended by the extension unit overlap each other, the determination unit uses the reliability to determine from which priority part the overlapping regions are extended.

* * * * *